US012587048B2

(12) United States Patent
Miyazono et al.

(10) Patent No.: US 12,587,048 B2
(45) Date of Patent: Mar. 24, 2026

(54) ELECTRIC MOTOR

(71) Applicant: TOYOTA JIDOSHA KABUSHIKI KAISHA, Toyota (JP)

(72) Inventors: Hideaki Miyazono, Kasugai (JP); Junichi Deguchi, Toyota (JP); Hironori Asaoka, Okazaki (JP); Kei Ohta, Toyota (JP); Sho Okazaki, Toyota (JP); Junya Kobayashi, Ama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 18/504,643

(22) Filed: Nov. 8, 2023

(65) Prior Publication Data

US 2024/0162766 A1 May 16, 2024

(30) Foreign Application Priority Data

Nov. 11, 2022 (JP) ................................. 2022-181188

(51) Int. Cl.
H02K 1/20 (2006.01)
H02K 9/19 (2006.01)

(52) U.S. Cl.
CPC ................. H02K 1/20 (2013.01); H02K 9/19 (2013.01)

(58) Field of Classification Search
CPC .. H02K 1/20; H02K 9/10; H02K 9/19; H02K 9/193
USPC ......................................... 310/54, 58, 59, 53
See application file for complete search history.

(56) References Cited

U.S. PATENT DOCUMENTS

| | | | | |
|---|---|---|---|---|
| 6,815,848 B1 * | 11/2004 | Glew | ..................... | H02K 5/207 |
| | | | | 310/58 |
| 11,125,315 B2 | 9/2021 | Graves et al. | | |
| 2010/0244594 A1 | 9/2010 | Murakami et al. | | |
| 2022/0094224 A1 * | 3/2022 | Huser | ..................... | H02K 9/00 |
| 2023/0208218 A1 | 6/2023 | Sakamoto | | |

FOREIGN PATENT DOCUMENTS

| | | | | | |
|---|---|---|---|---|---|
| CN | 111416463 A | * | 7/2020 | ............. | H02K 24/00 |
| CN | 114598094 A | * | 6/2022 | ............... | H02K 9/19 |
| DE | 102009001387 A1 | * | 9/2010 | ........... | B60L 3/0061 |
| DE | 102012215018 A1 | * | 2/2014 | ........... | H02K 5/203 |
| EP | 3726063 A1 | * | 10/2020 | ............. | H02K 5/203 |
| JP | 2003-509001 A | | 3/2003 | | |
| JP | 2015-115994 A | | 6/2015 | | |

(Continued)

*Primary Examiner* — Jeremy A Luks
(74) *Attorney, Agent, or Firm* — Sughrue Mion, PLLC

(57) ABSTRACT

An electric motor disclosed herein may include a stator, a supply hole, a first flow passage, and second flow passages. The first flow passage and the second flow passages may be provided in the stator. The first flow passage may extend along a circumferential direction of the stator. The second flow passages may extend along an axis of the stator and cross the first flow passage. A plurality of guides may be provided in the first flow passage to disturb a flow of refrigerant. The refrigerant is supplied from the supply hole to the first flow passage and disturbed by the guides. A part of the refrigerant of which flow is disturbed flows into the second flow passages. The refrigerant is distributed, thus, the refrigerant flows evenly into the second flow passages. The entire stator is thus effectively cooled.

10 Claims, 7 Drawing Sheets

(56)     References Cited

FOREIGN PATENT DOCUMENTS

| | | | |
|---|---|---|---|
| JP | 2018-174673 | A | 11/2018 |
| JP | 2019-110664 | A | 7/2019 |
| WO | 2010/109959 | A1 | 9/2010 |
| WO | 2021/246411 | A1 | 12/2021 |
| WO | WO-2023041738 | A1 * | 3/2023 .............. H02K 5/18 |

* cited by examiner

ELECTRIC MOTOR

REFERENCE TO RELATED APPLICATIONS

This application claims priority from Japanese Patent Application No. 2022-181188 filed on Nov. 11, 2022. The entire contents of the priority application are incorporated herein by reference.

BACKGROUND ART

The technique disclosed herein relates to an electric motor.

An electric motor includes a stator and a rotor that rotates inside the stator. For simplicity of explanation, "electric motor" will hereafter be simply referred to as "motor". The motor (electric motor) also includes a cooling structure to cool the stator. Japanese Patent Application Publication No. 2019-110664 describes an example of a structure for cooling a stator.

In the motor described in Japanese Patent Application Publication No. 2019-110664, a refrigerant flow passage is provided on the outer surface of the stator. A plurality of guides is provided in the refrigerant flow passage. The guides disturb a flow of refrigerant. Efficiency to cool the stator is increased by the refrigerant flowing in various directions in the refrigerant flow passage.

DESCRIPTION

The present disclosure provides a technique to cool an entire stator more effectively.

A motor disclosed herein may comprise a stator, a supply hole, a first flow passage, and a plurality of second flow passages. The stator may surround a rotor. The first flow passage and the plurality of second flow passages may be provided in the stator. The first flow passage may extend along a circumferential direction of the stator. The plurality of second flow passages may extend along an axis of the stator. The plurality of second flow passages may cross the first flow passage. A plurality of guides may be provided in the first flow passage to disturb a flow of refrigerant.

The refrigerant is supplied from the supply hole to the first flow passage. The flow of the refrigerant supplied to the first flow passage is disturbed by the guides. A part of the refrigerant of which flow is disturbed flows into the second flow passages. The refrigerant is distributed, by the plurality of guides, to the plurality of second flow passages arranged in the circumferential direction of the stator. Therefore, the refrigerant flows evenly into the second flow passages. The entire stator is thus effectively cooled.

Details of the technique disclosed herein and further developments will be described in "DETAILED DESCRIPTION".

DETAILED DESCRIPTION

Figure 1:
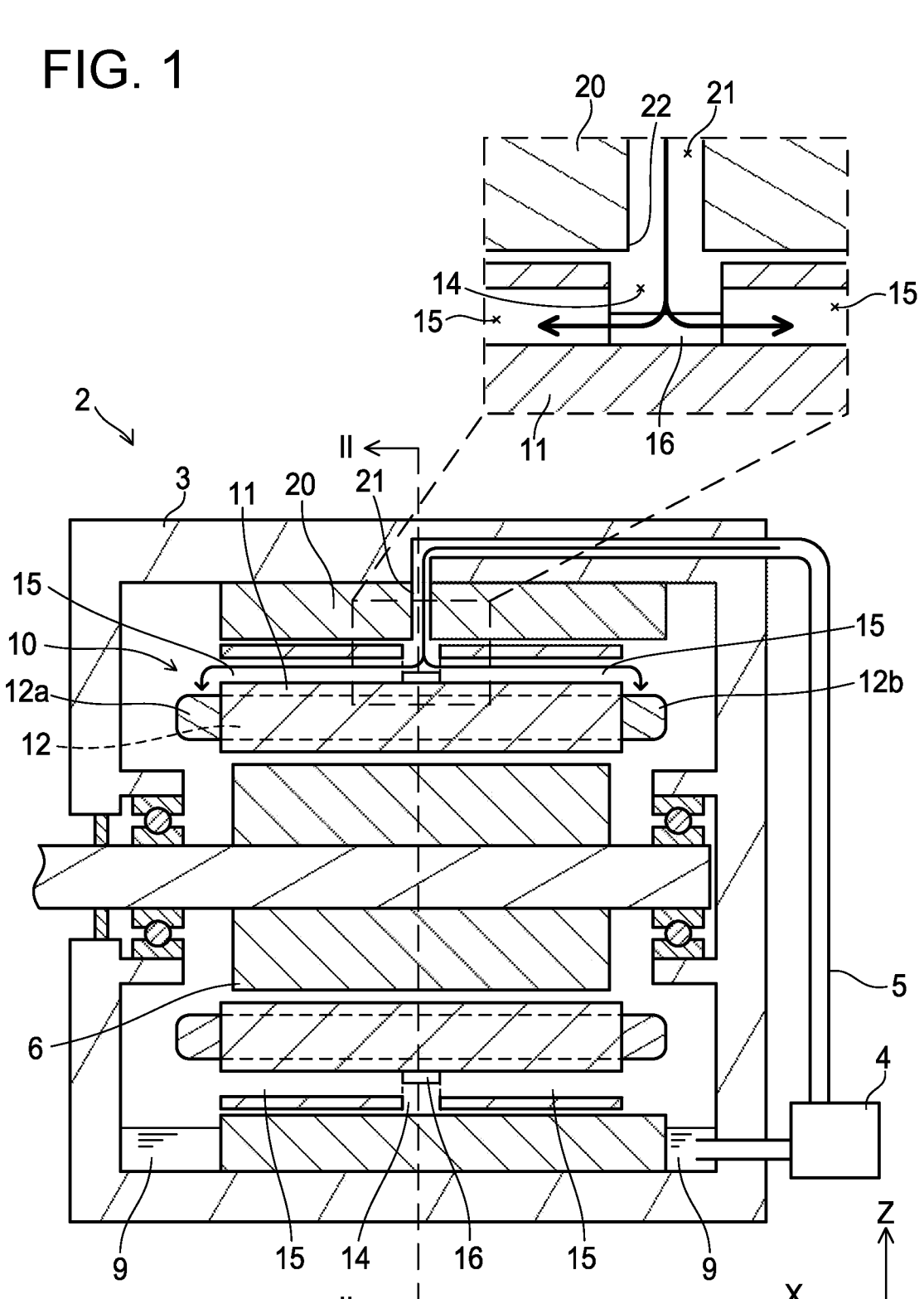
FIG. 1 illustrates a cross-sectional view of a motor of a first embodiment.

Prior to an explanation of embodiments, some features of the technique disclosed herein are listed below.

The motor may comprise a stator, a supply hole, a first flow passage, and a plurality of second flow passages. The stator may surround a rotor. The first flow passage and the plurality of second flow passages may be provided in the stator. A plurality of guides may be provided in the first flow passage to disturb a flow of refrigerant. Examples of the guides are plates connected to a bottom surface and both of side surfaces of the first flow passage. An area of each plate may be smaller than a cross-sectional area of the first flow passage. In the first flow passage, the guide plates may guide a part of the refrigerant to the second flow passages on right and left sides. Since the area of each guide may be smaller than the area of the first flow passage, the remaining refrigerant may flow downstream of the first flow passage beyond the guides.

A surface of each of the plates, which are the guides, may be connected with an inner surface of at least one of the second flow passages. A part of the refrigerant that collided with the guides is smoothly guided into the second flow passages.

The axis of the stator may be arranged horizontally. In such a case, the supply hole supplying the refrigerant to the first flow passage may be positioned between a center height and an overall height of the stator. In this case, an area of each of the guides positioned lower than a position (crossing position) at which an ejecting direction of the refrigerant ejected from the supply hole crosses the bottom surface of the first flow passage may be larger than an area of each of the guides positioned higher than the crossing position. The refrigerant tends to flow downward from the supply hole rather than upward from the supply hole. By increasing the cross-sectional areas of the lower guides, flow resistance of a lower portion of the first flow passage becomes larger than that of an upper portion. The refrigerant thus flows evenly upward and downward from the crossing position.

The guides may be arranged equally spaced in the circumferential direction of the stator. Cost to manufacture the stator including the guides can be reduced.

The guides may be protrusions protruding from the bottom surface of the first flow passage. Alternatively, each of the guides may have a wedge shape which is narrow on an upstream side and wide on a downstream side along a flowing direction of the refrigerant in the first flow passage. The wedge-shaped guides extend toward the side surfaces of the first flow passage on both sides. The wedge-shaped guides guide a part of the refrigerant in the first flow passage to the second flow passages while mitigating an increase in flow resistance in the first flow passage.

An example of a shape of the first flow passage is a groove provided in the outer surface of the stator. Examples of shapes of the second flow passages are holes provided in the stator.

When the axis of the stator is arranged horizontally, a number of the second flow passages arranged in an upper half of the stator may be greater than a number of the second flow passages arranged in the lower half of the stator. The second flow passages are open at the ends of the stator. The refrigerant that flowed out of the second flow passages in the upper half of the stator falls onto the lower half of the stator. In other words, the refrigerant that flowed out of the second flow passages in the upper half of the stator also cools the lower half of the stator. Therefore, by arranging the larger number of the second flow passages in the upper half of the stator than in the lower half thereof, the stator can be cooled more effectively.

First Embodiment

Referring to the drawings, a motor 2 of a first embodiment is described. FIG. 1 illustrates a cross-sectional view of the motor 2. The motor 2 includes a rotor 6 and a stator 10. The stator 10 is cylindrical and the axis of the stator 10 coincides with the axis of the rotor 6. For convenience of explanation, the axis of stator 10 and the axis of the rotor 6 will hereafter be simply referred to as "axis". The X direction of the coordinate system in the drawings corresponds to the direction of the axis. The +Z direction of the coordinate system in the drawings is directed vertically upward.

The stator 10 is fixed inside a housing 3 of the motor 2. The stator 10 includes a stator core 11 and a coil 12. The stator core 11 is obtained by stacking a plurality of electromagnetic steel plates. The stator core 11 may be obtained by pressurizing and solidifying magnetic iron powder. The ends of the coil 12 in the axis direction are referred to as coil ends 12a, 12b. The coil ends 12a, 12b refer to the ends in the axis direction of the coil 12 wrapped around teeth of the stator core 11. A center portion of the coil 12 is located inside the stator core 11, while the coil ends 12a and 12b are exposed from the stator core 11. At the ends of the stator core 11, the coil ends 12a (12b) extend along the circumferential direction of the stator core 11. Alternatively, a plurality of coil end pieces may be distributed in the circumferential direction of the stator core 11. In either case, the coil ends extend along the circumferential direction of the stator core 11. In the drawings, the stator core 11 is illustrated in a simplified fashion, and illustration of the detailed structure of the stator 10 (shapes of the teeth, windings of the coil, etc.) is omitted.

The rotor 6 is rotatably supported inside the housing 3 via bearings. The stator 10 surrounds the rotor 6. One end of a shaft of the rotor 6 extends to the outside of the housing 3. A space between the opening in the housing 3 and the shaft is sealed by a mechanical seal.

The stator 10 is cylindrical. A stator cover 20 covers the cylindrical stator 10. The stator cover 20 is also cylindrical and covers the outer circumference of the stator 10. A flow passage 21 is provided in the stator cover 20. One end of the flow passage 21 is connected to a flow passage 5 to be described later. The other end of the flow passage 21 opens at the inner surface of the stator cover 20.

Refrigerant 9 collects at the bottom of the housing 3, and a pump 4 pumps the refrigerant from the bottom and supplies the refrigerant 9 to the flow passage 21 in the stator cover 20. The refrigerant 9 is oil, which cools the stator 10 and the rotor 6. The refrigerant 9 also functions as a lubricant for smoothly rotating the rotor 6. In FIG. 1, the pump 4 is located outside the housing 3, but the pump 4 may be located inside the housing 3.

The flow passage 5 extends from the pump 4. The flow passage 5 passes through a wall of the housing 3 and is connected to the flow passage 21 which is open at the outer surface of the stator cover 20. As mentioned earlier, one end of the flow passage 21 is open at the inner surface of the stator cover 20. This opening is referred to as a supply hole 22. The supply hole 22 faces the outer surface of the stator core 11. The first flow passage 14 is provided around the outer circumference of the stator core 11. The first flow passage 14 extends around the cylindrical stator core 11. The supply hole 22 is open toward the first flow passage 14. A plurality of guides 16 is provided in the first flow passage 14. The guides 16 are described later.

The first flow passage 14 is defined by: a groove that extends around the outer circumference of the stator core 11; and the stator cover 20 that covers the groove. The inner surface of the stator cover 20 covers the groove in the stator core 11. In the drawings, a gap is illustrated between the outer surface of the stator core 11 and the inner surface of the stator cover 20. In reality, however, there is no gap therebetween, and the outer surface of the stator core 11 and the inner surface of the stator cover 20 are in contact with each other. Therefore, there is no leakage of the refrigerant 9 between the stator core 11 and the stator cover 20. The stator cover may be regarded as a part of the stator 10.

A plurality of second flow passages 15 extending along the axis of the stator 10 is provided in the stator core 11. Each of the second flow passages 15 crosses the first flow passage 14. In other words, the first flow passage 14 and each of the second flow passages 15 are in communication with each other. Both ends of each of the second flow passages 15 are open at both ends of the stator core 11. The openings of each of the second flow passages 15 (openings at the ends of the stator core 11) are located near the coil ends 12a and 12b.

The refrigerant 9 pumped by the pump 4 flows from the supply hole 22 to the first flow passage 14. Thick arrow lines in FIG. 1 illustrate the flow of the refrigerant 9. The guides 16 are provided in the first flow passage 14, and the flow of the refrigerant 9 in the first flow passage is disturbed by the guides 16. A part of the disturbed refrigerant 9 flows into second flow passages 15.

The refrigerant 9 that flowed through the second flow passages 15 is discharged from openings at both ends of the second flow passages 15. The refrigerant 9 discharged from the second flow passages 15 falls onto the coil ends 12a and 12b and cools the coil ends 12a and 12b. A part of the refrigerant 9 flows from the coil ends 12a and 12b onto the rotor 6 and cools the rotor 6. As described earlier, the refrigerant 9 lubricates the rotor 6.

Figure 2:
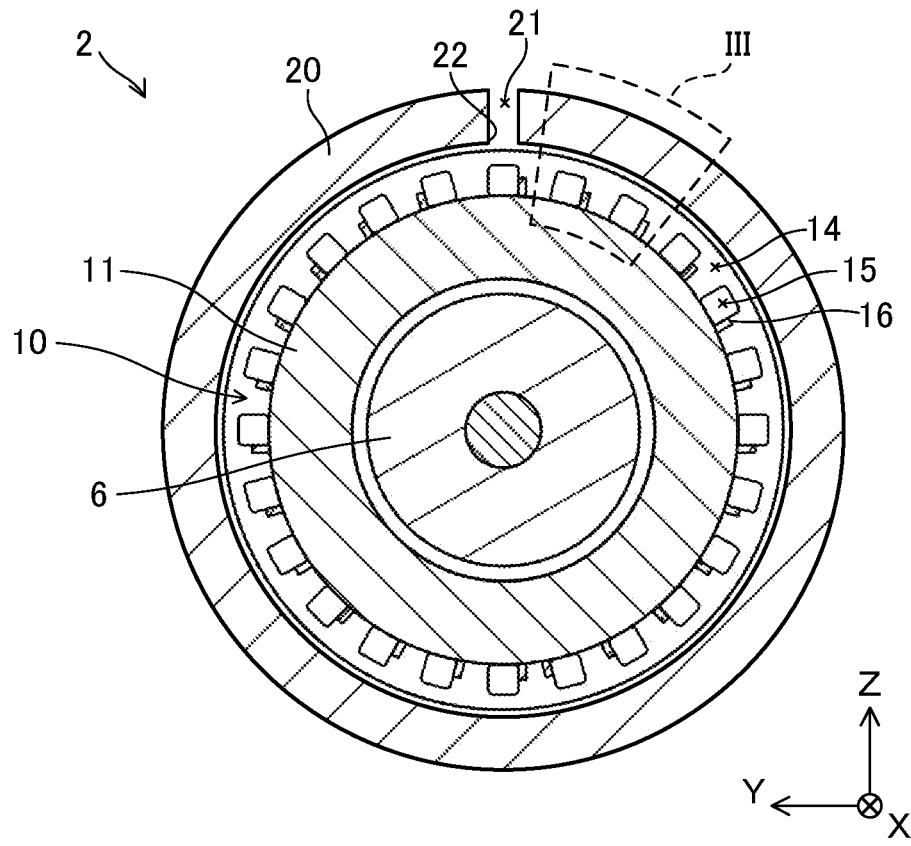
FIG. 2 illustrates a cross-sectional view of the motor cut along a II-II line in FIG. 1.

A cross-section of the motor 2 along a II-II line in FIG. 1 is illustrated in FIG. 2. In FIG. 2, only the rotor 6, the stator 10, and the stator cover 20 are illustrated, and illustration of the other parts (e.g., the housing 3) is omitted. FIG. 2 illustrates a cross-section obtained by cutting the rotor 6, the stator 10, and the stator cover 20 along the first flow passage 14.

A plurality of second flow passages 15 is provided in the stator core 11 (stator 10). As described earlier, the second flow passages 15 extend along the axis (X-axis) and are open at both ends of the stator core. The plurality of second flow passages 15 is arranged equally spaced in the circumference of the stator core 11. In other words, the plurality of second flow passages 15 is evenly distributed along the circumference of the stator core 11.

As described earlier, the plurality of guides 16 is provided in the first flow passage 14. Each of the guides 16 is arranged close to its corresponding ones of the second flow passages 15. As illustrated in FIG. 2, the plurality of second flow passages 15 is arranged equally spaced in the circumferential direction of the stator core 11, and the plurality of guides 16 is also arranged spaced substantially equally in the circumferential direction of the stator core 11. One guide 16 is arranged between each pair of adjacent second flow passages.

Figure 3:
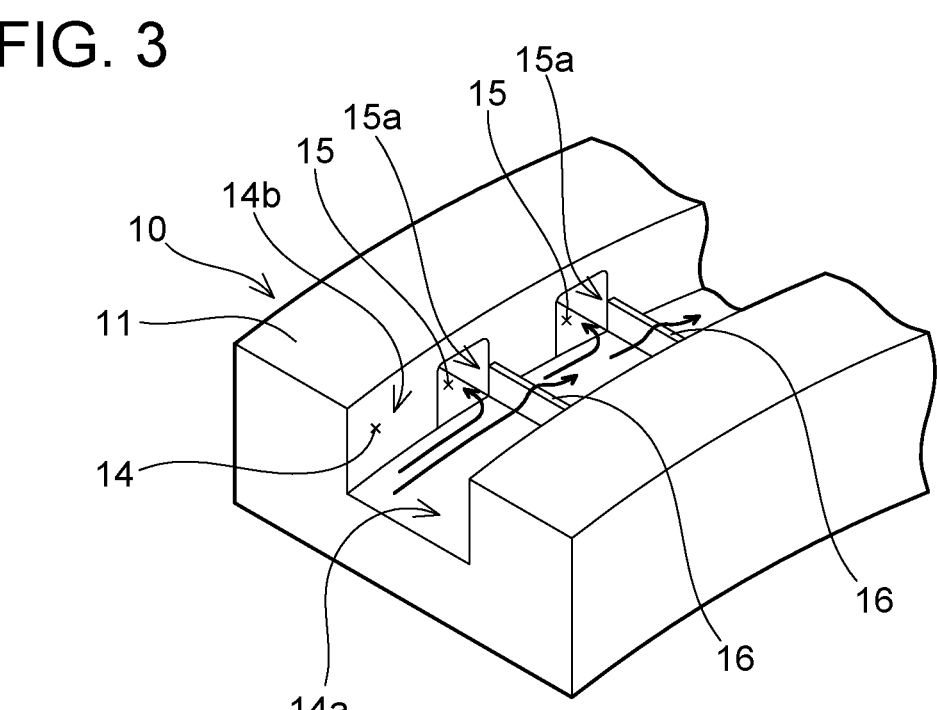
FIG. 3 illustrates an area enclosed by a dashed line III in FIG. 2 in a perspective view.

FIG. 3 illustrates a perspective view of a structure in an area enclosed by a dashed line III in FIG. 2. The thick arrow lines represent the flow of the refrigerant.

The guides 16 are plates connected to the bottom surface 14a and the side surfaces 14b of the first flow passage 14. An area of each of the guides 16 when viewed along a flow direction of the refrigerant is smaller than a cross-sectional area of the first flow passage. Therefore, a part of the refrigerant flows along the first flow passage 14 beyond the guides 16. The guides 16 disturb the flow of the refrigerant, and the rest of the refrigerant flows from the first flow passage to the second flow passages 15. Although not visible in FIG. 3, the second flow passages 15 are open at both side surfaces 14b of the first flow passage 14, and the refrigerant flows into the second flow passages 15 on both sides of the first flow passage 14.

The guides 16 are plates and their surfaces are connected with the inner side surfaces 15a of the second flow passages 15 on a downstream side of the refrigerant flow. In other words, the surfaces of the guides 16 are flush with the inner side surfaces 15a of the second flow passages 15 on the downstream side of the refrigerant flow. A part of the refrigerant that collided with the guides 16 is smoothly directed to the second flow passages 15.

By providing the plurality of guides 16, the refrigerant is distributed to the plurality of second flow passages 15 arranged along the circumferential direction of the stator core 11. Since the refrigerant is evenly distributed into the plurality of second flow passages 15, the entire stator is cooled evenly. In other words, the motor 2 of the embodiment can cool the stator 10 effectively.

As illustrated in FIG. 1, the first flow passage 14 is located at the center of the stator 10 in the axial direction. The refrigerant flows evenly from the first flow passage 14 to second flow passages 15 on both sides in the axial direction. The +Z direction is directed vertically upward, and the supply hole 22 is open at the highest position of the stator core 11. The refrigerant supplied from the supply hole 22 is divided equally toward both sides of the supply hole 22 (both sides when viewed along the axial direction).

The coil ends 12a (12b) are located at the ends of the stator core 11 and extend along the circumference of the stator core 11. The refrigerant distributed into the plurality of second flow passages 15 falls out of the openings of the plurality of second flow passages 15 and is sprinkled over the entire coil ends 12a, 12b. Thus, the motor 2 of the embodiment can also cool the coil ends 12a, 12b efficiently.

Figure 4:
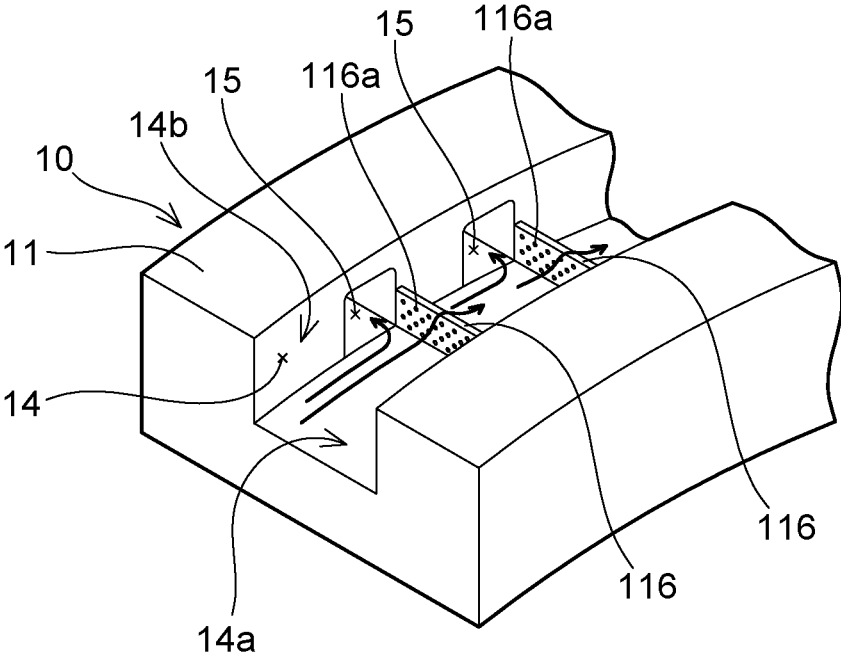
FIG. 4 is a perspective view illustrating guides of a first variant.

FIG. 4 illustrates guides 116 of a first variant. FIG. 4 is a view in which the guides 116 are arranged in place of the guides 16 in the perspective view of FIG. 3. The guides 116 are also plates and are connected to the bottom surface 14a and both of the side surfaces 14b of the first flow passage 14. As with the plurality of guides 16, the plurality of guides 116 is arranged spaced substantially equally in the circumferential direction of the stator core 11.

A plurality of holes 116a is defined in the guides 116. A part of the refrigerant flows through the plurality of holes 116a and along the first flow passage 14. Yet a part of the refrigerant flows along the first flow passage 14 beyond the guides 116. The rest of the refrigerant is guided by the guides 116 and flows into the second flow passages 15. An area of each of the guides 116 when viewed along the flow direction of the refrigerant is smaller than a cross-sectional area of the first flow passage 14. The guides 116 of the first variant provides the same effect as the guides 16. The guides 116 may be constituted of meshes instead of plates.

Figure 5:
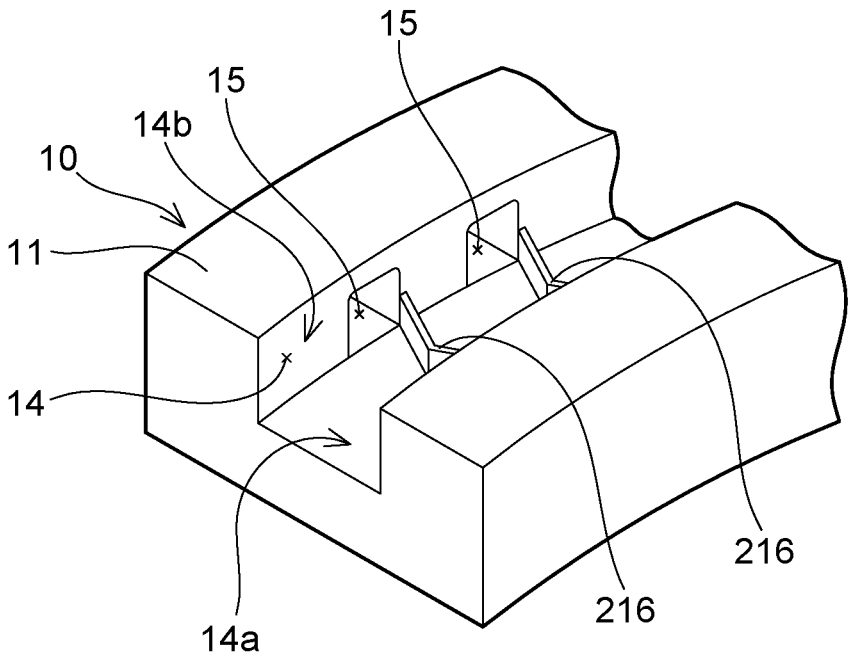
FIG. 5 is a perspective view illustrating guides of a second variant.

FIG. 5 illustrates guides 216 of a second variant. FIG. 5 is a view in which the plurality of guides 216 is arranged in place of the guides 16 in the perspective view of FIG. 3.

The guides 216 are constituted of plates bent at an acute angle. The guides 216 are connected to the bottom surface 14a and both side surfaces 14b of the first flow passage 14. As with the plurality of guides 16, the plurality of guides 216 is arranged spaced substantially equally along the circumferential direction of the stator core 11.

The guides 216 have wedge shapes. Each of the wedge-shaped guides 216 is arranged such it is narrow on the upstream side and is wide on the downstream side in the flow direction of the refrigerant (thick arrow lines in the drawing). In other words, the guides 216 are V-shaped. The tips of the V-shapes are directed to the upstream side of the refrigerant. The wedge-shaped guides 216 can smoothly guide a part of the refrigerant to the second flow passages 15 while reducing flow resistance in the first flow passage 14.

The guides 16 of the first embodiment and the wedge-shaped guides 216 may not be in contact with the side surfaces 14b of the first flow passage 14. Sizes of the guides 16, 116, and are determined by giving consideration to a refrigerant distribution ratio between the first flow passage 14 and the second flow passages 15.

Figure 6:
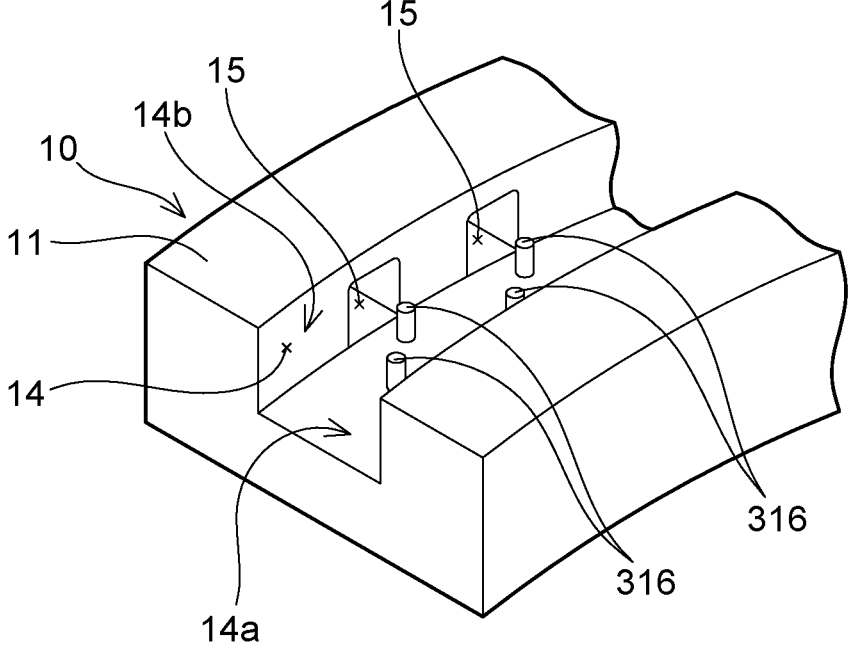
FIG. 6 is a perspective view illustrating guides of a third variant.

FIG. 6 illustrates guides 316 of a third variant. FIG. 6 is a view in which the plurality of guides 316 is arranged in place of the guides 16 in the same perspective view as FIG. 3. The guides 316 are protrusions protruding from the bottom surface 14a of the first flow passage 14. The height (s) and the number of protrusions are determined by giving consideration to the refrigerant distribution ratio between the first flow passage 14 and the second flow passages 15. The guides 316 of the third variant provide the same effect as the guides 16.

Second Embodiment

Figure 7:
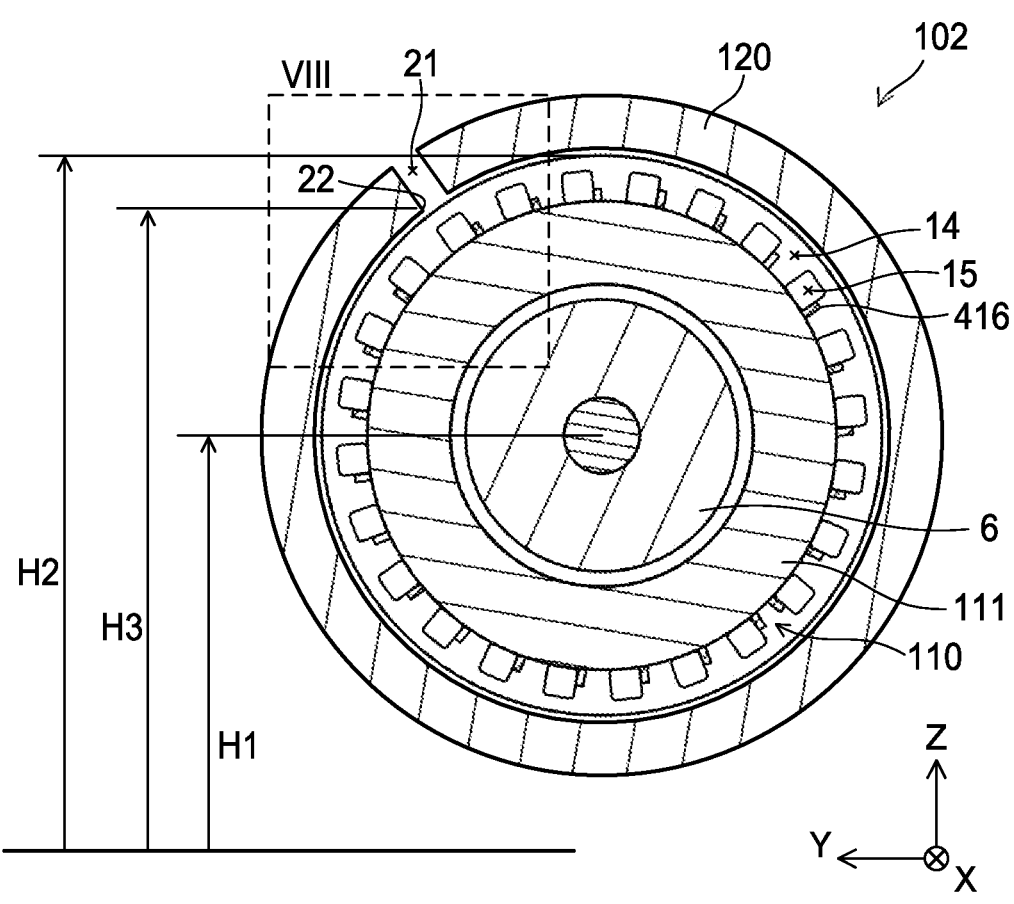
FIG. 7 illustrates a cross-sectional view of a motor of a second embodiment.
Figure 8:
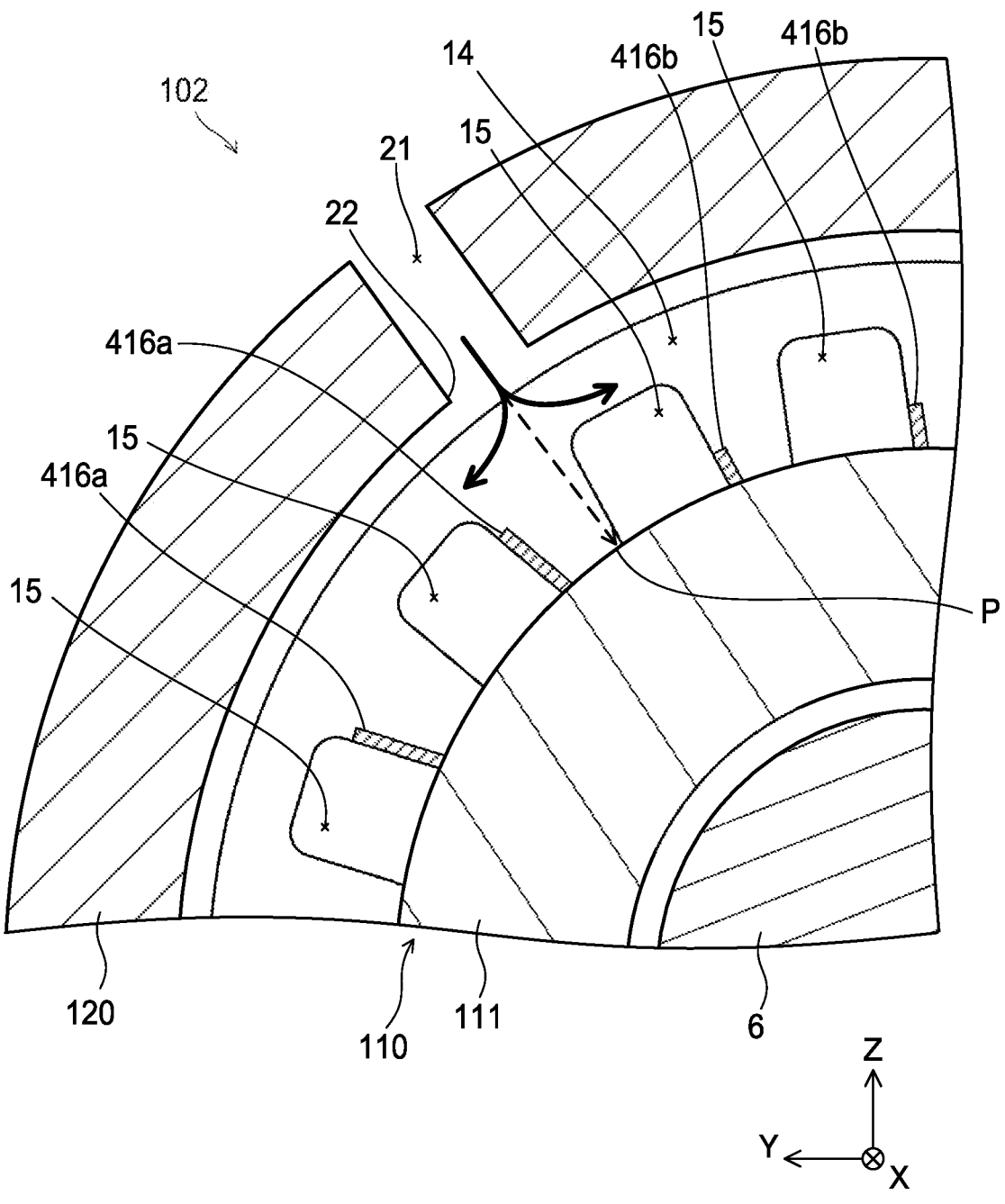
FIG. 8 illustrates an enlarged view of an area VIII in FIG. 7.

Referring to FIGS. 7 and 8, a motor 102 of a second embodiment is described. FIG. 7 is a cross-sectional view of the motor 102, and FIG. 8 is an enlarged view of the area VIII enclosed by a dashed line in FIG. 7. FIG. 7 corresponds to FIG. 2 of the first embodiment. As with FIG. 2, only a rotor 6, a stator 110, and a stator cover 120 are illustrated in FIG. 7, and illustration of the other parts is omitted.

The motor 102 includes the stator 110 and the stator cover 120. The first flow passage is provided around the outer circumference of a stator core 111 (the stator 110). FIG. 7 illustrates a cross-section obtained by cutting the motor 102 along the first flow passage 14.

The stator cover 120 surrounds the outer surface of the stator core 111. In FIG. 7 as well, a gap is illustrated between the stator core 111 and the stator cover 120, but in reality, there is no gap. The first flow passage 14 is defined by: a groove in the outer circumference of the stator core 111; and the inner surface of the stator cover 120 that covers the groove.

A plurality of second flow passages 15 is also provided in the stator core 111 (stator 110). The second flow passages 15 are holes that pass through the stator core 111 in the axial direction. Each of the plurality of second flow passages 15 crosses the first flow passage 14. That is, each of the second flow passages 15 is in communication with the first flow passage 14.

A plurality of guides 416 is provided in the first flow passage 14. As with the guides 16 of the first embodiment, the guides 416 are plates connected to a bottom surface 14*a* and side surfaces of the first flow passage 14. The plurality of guides 416 is arranged along the circumference of the stator core 111. As with the guides 16, the guides 416 disturb the flow of refrigerant in the first flow passage 14 and guides a part of the refrigerant to the second flow passages 15.

The stator cover 120 includes a flow passage 21, and one end of the flow passage 21 is open to the first flow passage 14. This opening is referred to as a supply hole 22. The refrigerant is supplied from the supply hole 22 to the first flow passage 14. In FIG. 8, reference signs 416*a* and 416*b* are given to the guides 416 located near the supply hole 22.

The +Z direction of the coordinate system in the drawings is directed vertically upward. The X and Y axes are oriented horizontally. The motor 102 is arranged such that the axis of the stator 110 is arranged horizontally. The X axis of the coordinate system in the drawings corresponds to the axis of the stator 110. The supply hole 22 of the refrigerant is positioned between a center height H1 and an overall height H2 of the stator 110 in the vertical direction. In FIG. 7, a height H3 of the supply hole 22 is higher than the center height H1 and lower than the overall height H2.

The refrigerant supplied from the supply hole 22 to the first flow passage 14 is split into two flows. If the supply hole 22 is positioned lower than the overall height H2, one flow is directed downward from the supply hole 22 and the other flow is directed upward from the supply hole 22. Thick arrow lines in FIG. 8 represent the flows of the refrigerant.

In FIG. 8, a position at which an ejecting direction of the refrigerant flowing out of the supply hole 22 (a dashed arrow line) crosses the bottom of the first flow passage 14 is referred to as a crossing position P. As shown in FIG. 8, among the guides 416A and 416B near the supply hole 22, the heights of the guides 416*a* positioned lower than crossing position P is greater than that of the guides 416B positioned higher than the crossing position P. Since widths of the guides 416A and 416B are the same, an area of each of the guides 416*a* positioned lower than the crossing position P is larger than an area of each of the guides 416B positioned higher than the crossing position P. With such a structure, a flow passage resistance of the first flow passage 14 lower than the crossing position P is greater than a flow passage resistance of the first flow passage 14 higher than the crossing position P. Therefore, the refrigerant flows equally downward and upward from the supply hole 22. Even when the supply hole 22 is positioned lower than the overall height H2 of the stator 110, the refrigerant flows evenly through the first flow passage 14. Hence, the stator 110 is effectively cooled. Further, the entire coil ends 12*a* and 12*b* are effectively cooled.

Third Embodiment

Figure 9:
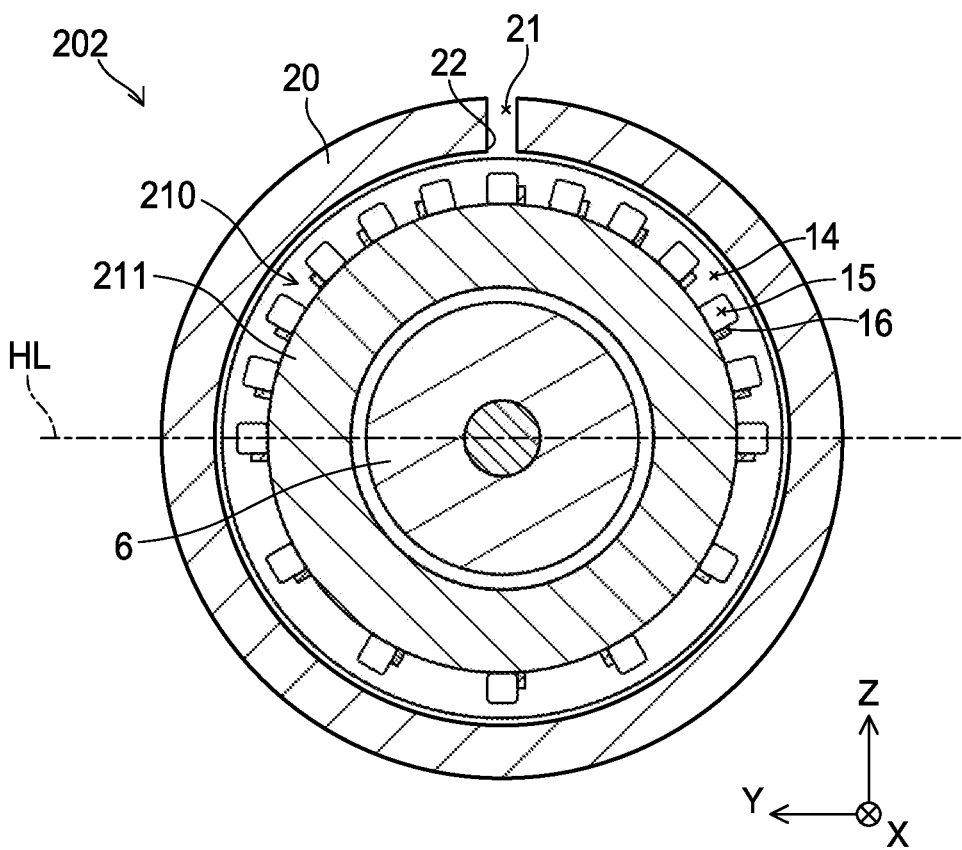
FIG. 9 illustrates a cross-sectional view of a motor of a third embodiment.

FIG. 9 illustrates a cross-sectional view of a motor 202 of a third embodiment. FIG. 9 corresponds to FIG. 2 of the first embodiment. As in FIG. 2, only a rotor 6, a stator 210, and a stator cover 220 are illustrated in FIG. 9, and illustration of the other parts is omitted.

The +Z direction of the coordinate system in the drawings is directed vertically upward. The X and Y axes are oriented horizontally. The motor 202 is arranged such that the axis of the stator 210 is oriented horizontally.

The stator 210 includes a first flow passage 14 and a plurality of second flow passages 15. The first flow passage 14 extends along the circumference of the cylindrical stator core 211. The first flow passage 14 is provided such that it extends around the stator core 211. The plurality of second flow passages 15 extends along the axis of the stator 210, and each of the second flow passages 15 crosses the first flow passage 14. Each of the second flow passages 15 is in communication with the first flow passage 14. A plurality of guides 16 is provided in the first flow passage 14. The guides 16 guide a part of the refrigerant in the first flow passage 14 to the second flow passages 15.

A one-dot-chain line HL in FIG. 9 is a horizontal line passing through the center of the stator 210. The number of the second flow passages 15 arranged in the upper half of the stator core 211 (stator 210) is larger than the number of the second flow passages 15 arranged in the lower half of the stator core 211 (stator 210). The second flow passages 15 are open at both ends of the stator core 211.

The refrigerant ejected from the openings of the second flow passages 15 falls vertically downward. The refrigerant ejected from the second flow passages 15 arranged in the upper half of the stator 210 falls onto the lower half of stator 210. In other words, the refrigerant ejected from the second flow passages 15 located in the upper half of the stator 210 also cools the lower half of the stator 210. Therefore, by providing more second flow passages 15 in the upper half of the stator 210 and fewer second flow passages in the lower half, the stator 210 can be cooled more effectively.

A part of the refrigerant ejected from the second flow passages 15 arranged in the upper half of the stator 210 also falls onto the coil ends 12*a* and 12*b* arranged in the lower half of the stator 210. The motor 202 can also effectively cool the coil ends 12*a* and 12*b* extending in the circumferential direction in the ends of stator 210.

As described above, the motor 2 (102, 202) which comprises the first flow passage 14, the plurality of second flow passages 15 and the plurality of guides 16 (116, 216, 316, 416) can effectively cool the entire stator 10 (110, 210).

Notes on the technique disclosed herein are described. The stator 10 (110, 210) includes the cylindrical stator core 11 (111, 211) and the coil ends 12*a*, 12*b* positioned at both ends of the stator core 11 (111, 211) in the axial direction. The first flow passage 14 extends along the outer circumference of the stator core 11 (111, 211) and extends around the circumference.

The plurality of second flow passages 15 extends parallel to the axis of the stator 10 (110, 210) and is open at both ends of the stator core 11 (111, 211). The plurality of second flow passages 15 may be provided in the stator core 11 (111, 211) such that the second flow passages extend around the axis in a spiral form. The curved second flow passages are longer than the linear second flow passages, by which the stator 10 (110, 210) can more effectively be cooled.

The guides 16 (116, 216, 316, 416) may be a part of the stator 10 (110, 210) or may be separate parts from the stator 10 (110, 210). The guides 16 (116, 216, 316, 416) may be constituted of the same material as a material of the stator 10 (110, 210) or may be constituted of a different material than the material of the stator 10 (110, 210). When the stator core is a stack of a plurality of electromagnetic steel plates, the guides may be protrusions provided on the electromagnetic steel plates.

The plurality of guides arranged equally spaced in the circumferential direction of the stator core is less expensive to manufacture than a plurality of guides unevenly distributed in the circumferential direction of the stator core. The plurality of equally-spaced guides is easier to manufacture than the plurality of guides unevenly distributed in the stator.

In the motors of the embodiments, the refrigerant is supplied to the first flow passage 14 through the flow passage 21 passing through the stator cover 20 (120, 220). The first flow passage may be a hole in the interior of the stator core 11 (111, 211). The flow passage guiding the refrigerant to the first flow passage may be a separate pipe provided not in the stator cover but in the housing. Alternatively, the flow passage guiding the refrigerant to the first flow passage may be provided in the housing.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. Further, the purpose of the examples illustrated by the present disclosure or drawings is to satisfy multiple objectives simultaneously, and satisfying any one of those objectives gives technical utility to the present disclosure.

What is claimed is:

1. An electric motor comprising:
a stator surrounding a rotor;
a first flow passage provided in the stator and extending along a circumferential direction of the stator;
a supply hole for supplying refrigerant to the first flow passage;
second flow passages provided in the stator and extending along an axis of the stator, the second flow passages crossing the first flow passage; and
guides provided in the first flow passage and configured to disturb a flow of the refrigerant in the first flow passage, wherein
coil ends are exposed at an end of the stator,
an opening of each of the second flow passages is located at the end of the stator, and
the refrigerant supplied through the supply hole flows in the first flow passage and each of the second flow passages, and is discharged from the opening of each of the second flow passages towards the coil ends.

2. The electric motor according to claim 1, wherein
each of the guides is connected to a bottom surface and both of side surfaces of the first flow passage, and
each of the guides is a plate whose area is smaller than a cross-sectional area of the first flow passage.

3. The electric motor according to claim 2, wherein a surface of each of the guides is connected with an inner surface of at least one of the second flow passages.

4. The electric motor according to claim 2, wherein
the axis of the stator is arranged horizontally;
the supply hole is positioned between a center height of the stator and an overall height of the stator; and
an area of each of the guides positioned lower than a crossing position at which an ejecting direction of the refrigerant ejected from the supply hole crosses the bottom surface of the first flow passage is larger than an area of each of the guides positioned higher than the crossing position.

5. The electric motor according to claim 2, wherein the guides are arranged equally spaced in the circumferential direction of the stator.

6. The electric motor according to claim 1, wherein the guides are protrusions protruding from a bottom surface of the first flow passage.

7. The electric motor according to claim 1, wherein each of the guides has a wedge shape which is narrow on an upstream side and wide on a downstream side along a flowing direction of the refrigerant in the first flow passage.

8. The electric motor according to claim 1, wherein the first flow passage is a groove provided in an outer surface of the stator.

9. The electric motor according to claim 1, wherein the second flow passages are holes provided in the stator.

10. The electric motor according to claim 1, wherein:
the axis of the stator is arranged horizontally; and
a number of the second flow passages arranged in an upper half of the stator is larger than a number of the second flow passages arranged in a lower half of the stator.

* * * * *